(12) United States Patent
Harris

(10) Patent No.: US 8,807,433 B1
(45) Date of Patent: Aug. 19, 2014

(54) DIRECT METHANOL FUEL CELL SYSTEM, FUEL CARTRIDGE, SYSTEM OF OPERATION, AND SYSTEM FOR DETECTING FORGERY

(75) Inventor: Scott C. Harris, Rancho Santa Fe, CA (US)

(73) Assignee: Harris Technology, Inc., Rancho Santa Fe, CA (US)

( * ) Notice: Subject to any disclaimer, the term of this patent is extended or adjusted under 35 U.S.C. 154(b) by 1706 days.

(21) Appl. No.: 11/841,998

(22) Filed: Aug. 20, 2007

Related U.S. Application Data

(63) Continuation of application No. 11/126,493, filed on May 10, 2005, now abandoned.

(60) Provisional application No. 60/587,733, filed on Jul. 13, 2004, provisional application No. 60/572,549, filed on May 18, 2004.

(51) Int. Cl.
*G06K 7/10* (2006.01)

(52) U.S. Cl.
USPC .................................................. 235/462.01

(58) Field of Classification Search
USPC ............. 235/462.01, 380, 375, 492; 320/101; 329/22, 25, 34
See application file for complete search history.

(56) References Cited

U.S. PATENT DOCUMENTS

| | | | |
|---|---|---|---|
| 7,137,000 B2 * | 11/2006 | Hohberger et al. | 713/168 |
| 7,387,249 B2 * | 6/2008 | Hudson et al. | 235/462.01 |
| 2002/0154915 A1 * | 10/2002 | Bullock et al. | 399/12 |
| 2004/0247951 A1 * | 12/2004 | Inagaki et al. | 429/12 |
| 2005/0118468 A1 * | 6/2005 | Adams et al. | 429/22 |
| 2006/0192523 A1 * | 8/2006 | Nomoto | 320/101 |

\* cited by examiner

*Primary Examiner* — Thien T Mai
(74) *Attorney, Agent, or Firm* — Law Office of Scott C. Harris, Inc.

(57) ABSTRACT

A cartridge for a fuel cell. In one aspect, the cartridge can have either fuel or water or cleaning solution. Multiple different cartridges can be used in a single electronic device. The cartridge can be pierced by a piercing device that can be electronically for mechanically operated. The piercing device allows water to be removed from the cartridge. A cover can be over the area which will be pierced by the piercing device.

12 Claims, 4 Drawing Sheets

US 8,807,433 B1

DIRECT METHANOL FUEL CELL SYSTEM, FUEL CARTRIDGE, SYSTEM OF OPERATION, AND SYSTEM FOR DETECTING FORGERY

CROSS RELATED APPLICATIONS

This application claims priority from Provisional Application No. 60/587,733, filed Jul. 13, 2004, and Provisional Application No. 60/572,549, filed May 18, 2004, the disclosures of which are herein incorporated by reference.

BACKGROUND

Direct methanol fuel cells have become extremely promising as a power source for use in portable electric and electronic appliances. The basic technology described in U.S. Pat. No. 5,599,638 describes the use of the direct methanol fuel cell, which generates power from methanol by removing protons directly from the methanol. This operates without using liquid acid or a reformer, and has many benefits including a biorenewable fuel source, and virtually no undesired pollutants as output.

One of the applications of such a fuel cell is for use in powering portable electronic equipment, such as laptop computers and cellular telephones and the like. When used in this way, it is predicted that the methanol would be supplied for the user in cartridges which could be inserted into the electronic device, and used to power the electronic device. When the cartridge is empty, the cartridge is replaced with a new cartridge, typically a cartridge which is readily available. In this way, the user can use the cartridges in place of batteries.

However, unlike disposable batteries, the cartridges produce relatively few pollutants. In addition, the expectation is that a cartridge of methanol will last many times longer than a battery of comparable size.

There are many issues involved in such a system, and the present application describes technological solutions to a number of these issues.

SUMMARY

The present application describes a number of issues associated with use of a fuel cartridge and a portable electronic device.

One aspect describes determining an optimal amount of water to be used in a fuel cartridge with methanol therein.

Another aspect describes different canisters, one for water, and one for methanol fuel.

Another aspect describes configuring an electronic system which can be powered from either methanol or batteries, and sizing the methanol cartridge of a similar size to a battery.

Another aspect describes the ways of holding the fuel cell into the electronic device, and different ways of receiving fuel from the cartridge.

Another aspect, which is usable not only in fuel cells, but also in any branded device, relates to a way of detecting authenticity of the disposable device.

BRIEF DESCRIPTION OF THE DRAWINGS

These and other aspects will now be described in detail with reference to the accompanying drawings, wherein.

DETAILED DESCRIPTION

Figure 1:
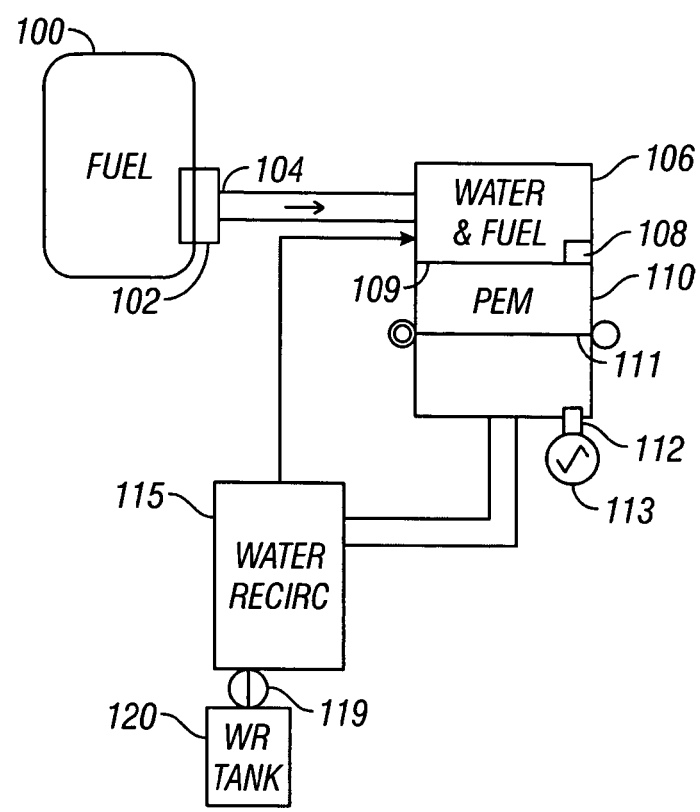
FIG. 1 shows a basic direct methanol fuel cell system.

A basic direct methanol fuel cell intended for use with an electronic device is shown in FIG. 1. A source of methanol fuel, here a methanol fuel cartridge 100, stores the methanol fuel which will be used by the fuel cell. The cartridge 100 may include a filter 102 which may be part of the cartridge, or part of the electronic device to which the cartridge is attached. The fuel is supplied by a fuel supply mechanism 104, which may be passive such as a wicking or gravity fed, or may be a pumping mechanism of some type. The area 106 may be an area surrounding a portion of the fuel cell, or may be a special aqueous solution container. In any case, the solution of methanol within the area 106 is detected by 108 which is a methanol concentration sensor. A proton electrolyte membrane 110 carries out the actual chemical reaction of converting between methanol and electricity. The details of this operation are described in U.S. Pat. No. 5,599,638, and are further described in publication 2004-0093 81, and in publication 2003018 0594. Many different ways of forming the proton electrolyte membrane are known, and these are beyond the scope of this patent application. Any known way of forming the membrane may be used.

The first side 109 of the proton electrolyte membrane is in contact with the aqueous methanol solution. The second side 111 of the proton electrolyte membrane is in contact with air, which is supplied through 112, either passively or using a fan or fluid pump 113.

More operations of the methanol fuel cell is carried out according to the known reaction. Water is produced as part of this reaction. In order to minimize the amount of spare water which is carried by the device, a water recovery unit 115 operates to recover water from the fuel cell, and return it to the aqueous solution container 106.

The water recovery system is intended to recover all of the water within the methanol system, as the used by the fuel cell. However, no system of this type can ever be perfect. The present inventor believes that some water will always be lost due to various circumstances. For example, the methanol fuel cell requires air to operate; some water will be lost during the production of the air. In addition, while it is desirable to use pure water in this system, there may be a buildup of contaminants over time, and it may be desirable to periodically intentionally remove a portion of the water from the fuel cell. Many of these different reasons may contribute to the desire to replenish a portion of the water at various times.

Previous systems, such as described in publication 2004-000938, have described that the fuel cartridges will maintain the highest possible concentration of methanol. According to a first aspect, described according to this embodiment, the system herein finds an amount of water to be replenished on a periodic basis. For example, it may be decided that during each fuel replenishment cycle, 10% of the water should be changed. In this embodiment, a certain amount of the water from the water recovery unit 115 is stored into a removal tank 120. This amount may be metered by a flow meter 119. In any case, a certain amount of the water is removed into the water removal tank 120. The water removal tank 120 may then use residual heat from the fuel cell to evaporate the water, or may allow the water to drip out in some other way. The tank 120 is preferably a removable and either cleanable or replaceable tank, since the contaminants that accumulate in the water may be part of that tank.

The methanol fuel which is stored in cartridge 100 is intentionally diluted with a specified amount of water based on the amount of water removed, and a calculated amount of water which will be lost by the fuel cell. This dilution is intended to replenish that amount lost through normal operation of the fuel cell, as well as the amount which is intentionally removed. In one embodiment, the amount which is intentionally removed can be zero, and in that embodiment, the fuel is intentionally diluted by substantially exactly the amount which makes up for the amount of loss of water within the fuel cell.

It is contemplated that the amount of water lost during operation of the fuel cell is probably 0.1-2% of the total water quantity at any given time. It may be desirable to change a comparable amount of the water during each fuel cell cycle. For example, if the fuel cell is 98% efficient in recycling the water, then may be desirable to intentionally remove another 2% of the water to avoid contaminant buildup. In one embodiment, therefore, an amount of water is intentionally removed that is within 10% of the amount of the water which is unintentionally lost to fuel cell operation. However, the amount of water which is removed can be any amount, ranging from zero in an embodiment where no water is removed, to as high as five times the amount of water unintentionally removed. In another embodiment, as much as 10% of the total amount of water in the fuel cell may be changed. However, is contemplated that the amount intentionally removed remain between 1 and 2% during each cycle of operation of the fuel cell.

Figure 2:
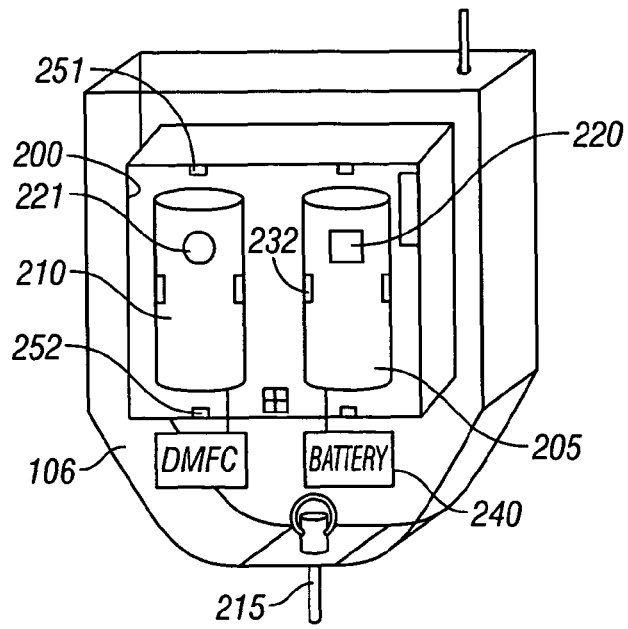
FIG. 2 shows dual cartridges, which can be of multiple types, within an electronic device.

FIG. 2 shows an embodiment with dual cartridges, which may be the same embodiment or a different embodiment than that shown in FIG. 1. FIG. 2 shows the device used in a cellular telephone, although it should be understood that this system can be used in any type of electronic equipment and preferably portable electronic equipment. The cellular telephone is shown within indented cavity area 200, within which the fuel cartridges are placed. In this environment, two cartridges are used, including a first fuel cartridge 205 which stores fuel of either very high purity, or the intentionally diluted purity described in the first embodiment. A second cartridge 210 can be one of multiple different kinds of cartridges. In a first variant, the second cartridge 210 can simply be a second fuel cartridge. For example, this system may allow use with two relatively small fuel cartridges, where the second fuel cartridge 210 is used once the first fuel cartridge 205 has emptied. This allows the user time to switch out the fuel cartridge, without worrying about running out the fuel.

In another embodiment, the auxiliary cartridge 210 may be a water cartridge, used to replenish and/or change the water used in the reservoir at 106. It may be desirable to periodically change the water, in which case a water cartridge 210 could be used. The water in the cartridge 210 may be of special characteristics, for example it may be extremely filtered, or have a high concentration of certain kinds of ions which may be used to clean the methanol device. In this embodiment, the reservoir 106 is maintained at the bottom of the cellular phone, and an adjustable drain 215 is also provided. The drain is normally closed, but may be electronically or mechanically opened to allow all of the water and/or water fuel mixture to be removed from the reservoir.

In the embodiment, each of the cartridges includes a special indicia shown as 220 which indicates the contents of the cartridge. The indicia may be of a specified shape, detected by the unit. For example, the indicia 220 indicates that the cartridge is a fuel cartridge, while the indicia 221 indicates that the cartridge is a water cartridge.

Periodically the user may need to add more water or remove water. When the fuel cell detects a water cartridge, it may prompt the user to open the drain to allow a certain amount of the water to be drained out, thereafter replenishing the water from the water cartridge 221.

In an alternative embodiment, a special cleaning cartridge, may be used. The fuel cell uses specified kinds of catalysts, such as platinum catalysts, which may over time become less effective due to impurities in the water or fuel or other. The special cleaning cartridge may be of a special kind of solvent which is intended for use in cleaning the direct methanol fuel cell. The cleaning cartridge may cause the fuel cell to undergo a cleaning operation, and again after which the residue is removed through drain 215.

Figure 3:
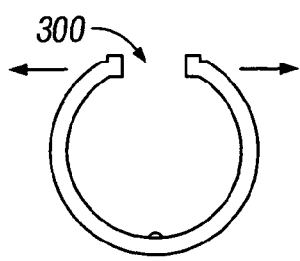
FIG. 3 shows a spring clip for a cartridge.

In this embodiment, the cartridges are shown as generally cylindrical, although they may be of any shape. In this embodiment, the cartridges are clipped into place, and held by spring clips 232. The spring clips 232 are shown inside the view in FIG. 3. Basically they are formed of spring steel, and cover more than half of the outer circumference of the fuel cell's outer body shape. The sides of the spring clip can be generally extended outward to expand the space 300, and allow the fuel cell to be inserted therein. One or many of the spring clips may be used.

In the embodiment of FIG. 2, the electronic device also includes a rechargeable battery 240 which is recharged during operation of the fuel cell, but which stores power that allows the fuel cell to carry out certain operations especially during the operation of changing fuel canisters. For example, the battery may operate a motor or solenoid to assist in changing the fuel canisters. Once the fuel canister has been replaced, the battery may carry out certain operations for starting the fuel cell, initial pumping of the fuel cell, or other startup operations.

Figure 4:
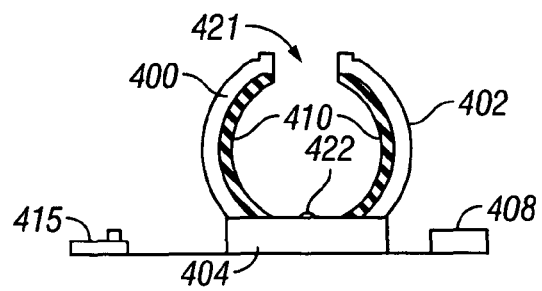
FIG. 4 shows a movable clip.

In an alternative embodiment, the clip positions are electronically controlled by a solenoid. In this embodiment, shown in FIG. 4, the leftmost clip portion 400 is separated from the right most clip portion, and held on a track 404. A motor 406 operates the tracks so that the clips 400 and 402 can move further from and closer to one another. Preferably each of the clips 400, 402 is lined with a rubber or elastomeric material such as 410. The clips are pressed against each other until the fuel canister is tightly held between the elastomeric material, thereby held tightly into place.

According to another aspect of this system, the fuel canisters are formed in the size of conventional batteries. For example, in the embodiment shown in FIG. 2, the fuel canister may be formed in the size of AA batteries or "C" batteries. This allows the use of batteries in place of the fuel source, if desired. Electrical contacts, shown as 251, 252 may also be provided. When the battery is placed into the cell in place of the fuel cell, then a current is detected on these contacts, causing the system to operate in battery mode instead of fuel cell mode. As an alternative, one battery may be used with one fuel cartridge, where the fuel cell operates until depleted, maintaining the charge on the battery during that time. Alternatively, in the case of the nonrechargeable battery, the system may simply operate based on the fuel cell and then the battery. The battery is used until the user is able to replace the fuel cell canister.

Figure 5:
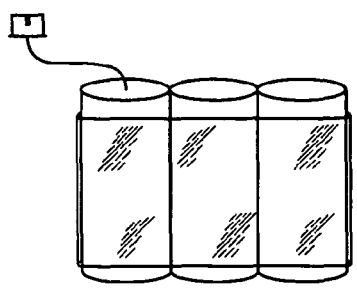
FIG. 5 shows a cartridge formed of multiple separate units which are banded together.

It is contemplated that canisters the size of different batteries would have numerous advantages. First of all, packaging for battery-sized fuel canisters could use the same packaging conventionally already available for batteries. This system contemplates batteries of AAA, AA, C or D size, as well as battery packs formed of packed together battery cells. For example, two or three battery cells are often held together, and shrink-wrapped, as shown in FIG. 5. For example three AA battery size batteries shrink-wrapped together may be the standard size for a specified fuel cartridge. In the case of the battery pack of FIG. 5, a connector is often provided, and connector receptacle 252 is shown in FIG. 2.

This embodiment may use conventional valves or the like to allow the fuel from the fuel canister to the imported into the fuel cell. An alternative, however, uses a puncturing mechanism. In the FIG. 4 embodiment, two sets of the retractable clips may be used. The clips operate as follows.

The user may signal their desire to remove a canister by pressing a special button, such as 415. This causes the clips to retract, allowing the user to remove the canister from the area 421. The user then presses another canister into place. A mechanical switch 422 contacts the canister that has been pressed into place, and causes the clips to be moved towards one another. The motor monitors an amount of torque placed on the clips. When an amount of torque exceeds a specified amount, for example 8 ft.-pounds, the clips are stopped and locked into place.

Figure 6:
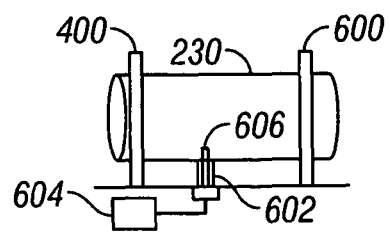
FIGS. 6 and 7 show a piercing mechanism.
Figure 7:
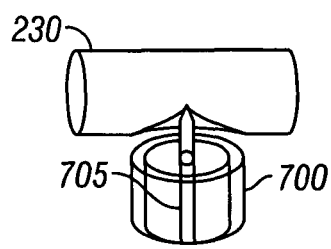

FIG. 6 shows a side view of the fuel canister 230 with the first clip 400 and locked into place, in the second clip 600 also locked into place. Once appropriately locked into place, the fuel canisters cannot move. A piercing mechanism shown as 602 is then extended using another motor, shown as 604, so that the end portion 606 of the piercing mechanism is actually located into a special portion within the fuel canister. Various forms of self ceiling piercing mechanisms are known, and may be used for this purpose. For example, in an alternative embodiment, the piercing mechanism may include an elastomeric portion shown in FIG. 7. In FIG. 7, the elastomeric portion is extended in pressed against the walls of the canister 230. Within that elastomeric portion, is a second piercing mechanism is shown as 705. Once the elastomeric portion is fluidically sealed against the outer surface, the piercing portion is pressed into place. This forms a self sealing system. However, any other type of self sealing system can also be used.

An important feature when using these fuel cells will be branding of the fuel which is used. Low quality or substandard fuel may cause eventual problems with the fuel cell, or may be more diluted and not work as well within the fuel cell. The users may want to rely on the branding of the fuel that is used.

However, counterfeit copying of consumable devices is rampant. This environment is usable not only with a fuel cell of this type, but also with any device which can be easily counterfeited. Examples of such devices include most consumables; e.g., cartridges for printers and laser printers are quite often counterfeited as have many other similar consumables. Accordingly, while this embodiment describes use in a fuel cell, for determining whether the fuel cell cartridge is counterfeit, it may alternatively be used in other similar systems, and more specifically, in any consumable item.

The counterfeit prevention indicator uses a one-way code. One-way codes are well known in the art. Basically, a one-way code takes advantage of large numbers to produce a code which is difficult for another to produce, but easy for someone to verify as being real. Public-key encryption is one example of one-way codes. When using a public-key encryption system, a code is produced which is easy to verify as being correct, but very difficult to duplicate. Any such code of this type can be used. The code can be a hash function, or any other kind of cryptographic verification code.

Figure 8:
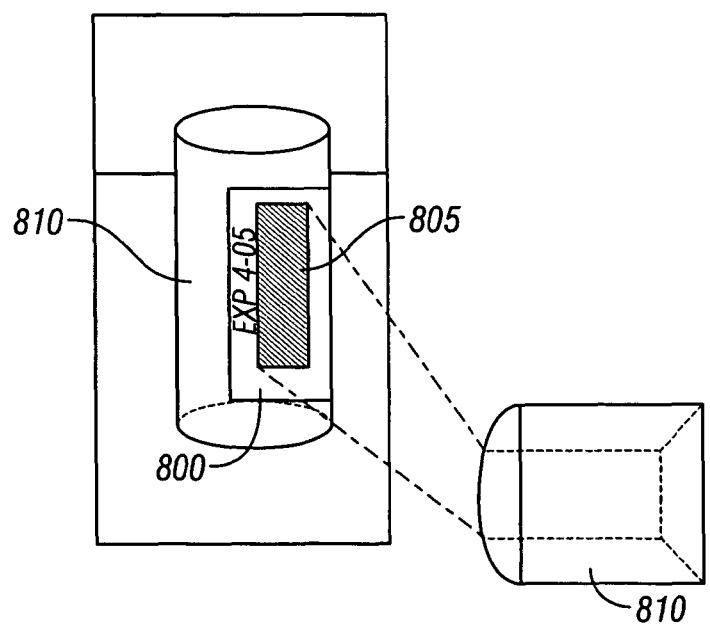
FIG. 8 shows a counterfeit prevention device.

FIG. 8 shows the packaging of the fuel cartridge, again here shown as a cylinder, with it being understood that the cartridge could be packaged in any desired shape. The packaging also includes an outer box portion, with a window shown as 800. The window allows the user to see directly to the outer surface of the cartridge itself. A verification code 805 is placed on the outer surface of the cartridge. The verification code is a printed representation of a one-way code which verifies that the cartridge is authentic. The code may also verify a date of manufacture or date of expiration, or may include any other number as a result of its hash calculation. For example, the device may be imprinted with an expiration date as shown as 810 for example expiration 4/05. One portion of the result of the encryption of the one-way code 805 may include the expiration date, thereby providing the user with additional surety that the device is authentic. Other such verification mechanisms are also possible. These verification mechanisms may also include the present day, to prevent a counterfeiter from simply selecting a known authentic device, and copying that known authentic device.

The code 805 may be a machine-readable number, or may be a two-dimensional or one-dimensional bar code, or may be encrypted in a hologram, or encoded on the device using any other known means. Techniques of encoding a number into a hologram are well known. In an embodiment, a reader is also provided which may be a relatively inexpensive device offer to users for a nominal fee. The reader reads and decrypts the code, and determines authenticity and validity. The reader can also be included into other devices, such as handhelds, PDAs, or other kinds of computers.

The reader may be given to users, or alternatively may be provided to the retail establishments to allow the retail establishments to determine and verify the authenticity of the device.

In a particularly preferred embodiment, the number is encoded on a hologram, and the reader includes a hologram reader, as well as a computer for detecting the one-way code. The one-way code detection may be done on a single chip, may be updated as necessary, and the like.

Figure 9:
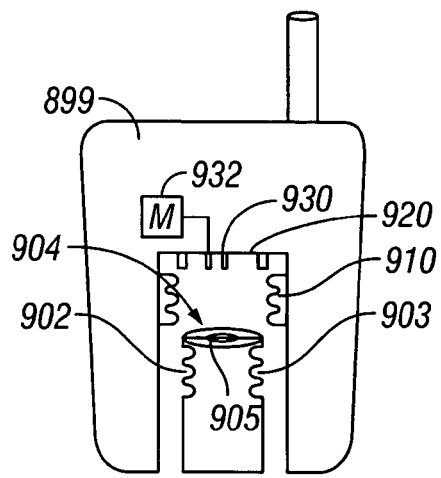
FIG. 9 shows a screw-in style canister.

FIG. 9 shows a screw connection embodiment for a generally cylindrical cartridge shown as 900. In this embodiment, shown as screwing into a cell phone, the cartridge 900 is generally cylindrical, and includes screw threads 902 at one end thereof. That end, referred to as the connection end 903, also includes a connection surface 904 adapted for connecting to the fuel receptacle.

The cell phone 899 includes matching thread portions 910 which match with and thread to, the thread portions 902 on the cartridge 900. This allows the fuel canister 900 to be screwed into place and held tight against the connection surface 920 of the cell phone. When held tight in this way, the connection surface 904 of the canister 900 may be pressed tight against the connection surface 920 of the cell phone. In one embodiment, the connection surface 904 may include an O-ring shown as 905 which maintains a fluid tight connection.

The connection surface of the cell phone, 920, also includes a fuel receptacle piercing portion 930 thereon. The fuel receptacle portion may be simply a stationary piercing portion that pierces the surface 904 of the canister when the canister is screwed therein. In another embodiment, however, a motor 932 may electrically move the piercing portion 930 into the fuel canister once the fuel canister has been seated into place.

Figure 10:
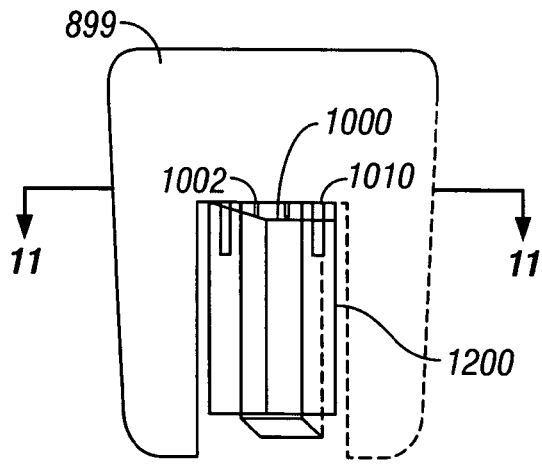
FIGS. 10 and 11 shows a square cross section canister.
Figure 11:
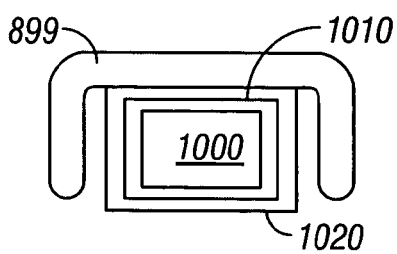

Another embodiment is shown in FIGS. 10 and 11, where FIG. 11 shows a cross-section along the line 11-11 in FIG. 10. In the FIG. 10 embodiment, the cartridge is actually rectangular in shape, although the same techniques would work for a cylindrical cartridge. In the FIG. 10 embodiment, the rectangular cartridge 1000 is placed within cavity within the cell phone 899. Again, the surface 1002 may be pierced by any of the piercing mechanisms described herein in order to remove the methanol from the cartridge. In this embodiment, however, the cell phone includes a substantially rectangular sleeve holder assembly 1010 that surrounds and is concentric with the cartridge. The sleeve holder assembly 1010 does not extend along the full length of the cartridge 1000. A shrink sleeve 1020 is placed around the edges of the sleeve holder, of a type which causes a shrink seal upon heating. The sleeve 1020 is shown in phantom in FIG. 10, with one being able to see the cartridge through the sleeve. In operation, the heat of operation of the fuel cell may shrink the sleeve into place, thereby sealing the cartridge. In an alternative operation, a special heater may be used.

The shrink wrap may be formed with perforations thereon to enable easier removal. A cross-section of the FIG. 11 device is shown in FIG. 11 showing the cell phone 899, the fuel cartridge 1000, the sleeve holder container 1000, which does not extend all the way up, and the shrink sleeve 1020. After heating is applied, the shrink sleeve 1020 will shrink into place, thereby holding itself against the different portions.

Figure 12:
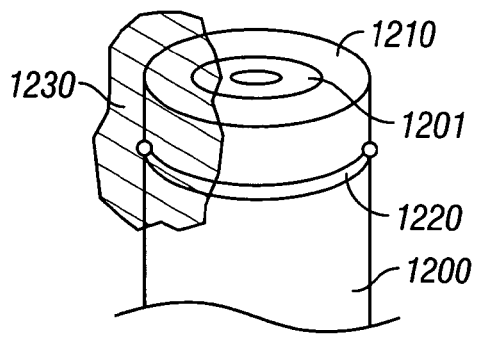
FIG. 12 show an embodiment with a plastic covering, and an O-ring.

Another embodiment is shown in FIG. 12. In the embodiment of FIG. 12, the cartridge, which can be cylindrical or rectangular is preformed with at least one O ring associated therewith. FIG. 12 shows a first connection type O-ring 1201 on the connection surface 1210 of the fuel cartridge 1200. A second O-ring 1220 may also or alternatively be formed on an outer surface of the cartridge. The second O-ring 1220 may be used in a situation where the cartridge fits snugly into the recess and seals against walls of the recess. In operation, the cartridge is packaged with a cover part 1230, preferably a removable plastic piece that is held to the cartridge by static electricity or by a removable closure, tightly held against the connection portion of the cartridge. The covering part 1230 protects the connection surface 1210 of the cartridge against contamination and also may maintain the position and sealing of the O-ring as 1201 and 1220. Prior to using the cartridge, the user removes the plastic covering 1230, and places the cartridge into place.

Figure 13:
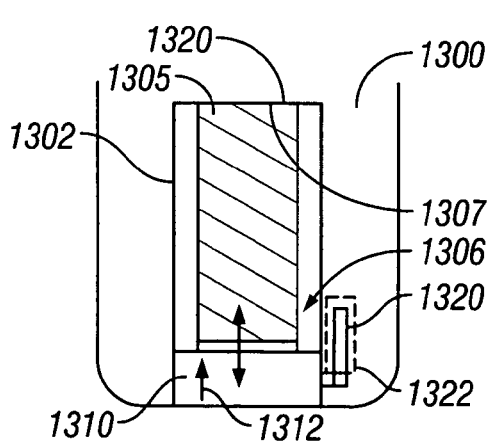
FIG. 13 shows a lever-operated embodiment.

Another embodiment is shown in FIG. 13, in which the electronic device 1300 has a cavity 1302 sized for the fuel canister. Again, this cavity 1302 may be rectangular or any other shape. A pressing device 1310 is movable between a first retracted position and a second position as shown in which the device is fully pressed against the cartridge 1305, and presses the cartridge firmly into connection with the connection surface 1320 on the electronic device. The movement of the pressing device is controlled by a lever 1320. The lever is rotatable between a first position in which the lever extends beyond the plane of the electronic device, and the pressing portion 1310 is fully retracted. In that position, the cartridge can be inserted into the cavity. Subsequently, the lever is pressed into a recess 1322 within the housing, pressing the pressing portion 1310 in the direction shown as 1312 thereby pressing the bottom surface 1306 of the cartridge, and also pressing the top surface 1307 of the cartridge into firm registration with the top surface 1320.

Figure 14:
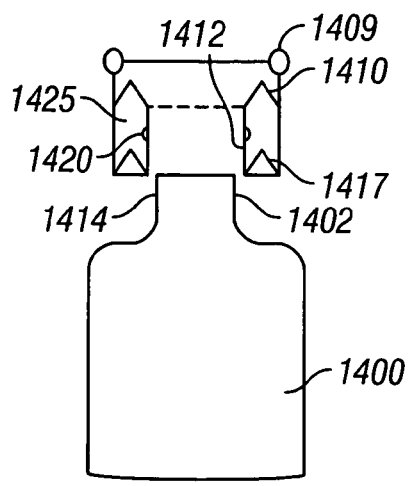
FIG. 14 shows an embodiment with a narrowed neck.

FIG. 14 shows yet another embodiment using a fuel canister that has a shape with two different sized portions. The fuel canister has a main portion 1400, which reduces in diameter to a reduced-diameter nozzle 1402. In this embodiment, the canister itself may be formed of plastic and may be cylindrical. The reduced diameter nozzle then fits within a corresponding receiver portion 1410 within the electronic device. The receiver portion 1410 includes inner surfaces 1412 which are sized to pressed against the outer services 1414 of the reduced diameter nozzle. A sealing mechanism 1420, such as an O-ring, may also be present to aid in the seal. Alternatively, the sealing mechanism 1420 may be a snap type mechanism.

In an embodiment, the structural portion 1425 of the receiving portion 1410 may be mostly hollow and filled with supporting ribs 1417 that establish pressure but allows elastic deformation so that the inner diameter 1412 can be expanded somewhat to allow the fuel canister to be placed therein. Once secured in place, any of the piercing mechanisms described above with respect to FIGS. 1-7 and 9-3 may be used to pierce any portion of the reduced diameter nozzle 1402.

The receiving mechanism 1410 may be hinged using hinge mechanism 1409 to allow the receiving mechanism to be pointed at an angle relative to the surface of the electronic device. This may facilitate inserting the fuel canister 1400.

Although only a few embodiments have been disclosed in detail above, other modifications are possible. All such modifications are intended to be encompassed within the following claims.

What is claimed is:

1. A method comprising:
    Determining a date associated with a consumable item, said consumable item being an item that is used with a second item other than said consumable item, and said consumable item being one that is consumed and replaced a different item, said consumable item having a material therein that is consumed by said different item;
    associating said date with said consumable item;
    using a computer for forming a code that is different than said date, but is based on said date; and
    said code being one which can be used by a consumer to verify authenticity of said consumable item, wherein said consumable item is in a package that has a see-through portion, and said code is printed directly on said consumable item in a location that can be seen through said package.

2. A method as in claim 1, wherein said consumable item is a cartridge for a fuel cell.

3. A method as in claim 1, wherein said consumable item is a cartridge for a printer.

4. A method as in claim 1 wherein said code is an encryption code, verifying that said encryption was done using an authentic code.

5. A method as in claim 4, wherein said encryption code is a cryptographic verification code.

6. A method as in claim 1, wherein said date represents an expiration date of said consumable item and said code also represents said expiration date.

7. A method as in claim 1, wherein said code is displayed as a barcode.

8. A method as in claim 1, wherein said code is displayed as a hologram.

9. A consumable item, comprising:
    A consumable item having a code thereon, said consumable item being an item that is used with a second item other than said consumable item, and said consumable item being one that is consumed and replaced by a different consumable item, said consumable item having a material therein that is consumed by a consuming part, said code being one that can be verified as being authentic, wherein said consumable item is in a package that has a see-through portion, and said code is printed directly on said consumable item in a location that can be viewed through said package, wherein said consumable item is a cartridge for a printer.

10. A consumable item, comprising:

A consumable item having a code thereon, said consumable item being an item that is used with a second item other than said consumable item, and said consumable item being one that is consumed and replaced by a different consumable item, said consumable item having a material therein that is consumed by a consuming part, said code being one that can be verified as being authentic, wherein said consumable item is in a package that has a see-through portion, and said code is printed directly on said consumable item in a location that can be viewed through said package, wherein said code represents an expiration date of said consumable item.

11. A method, comprising:

reading an encryption code from a consumable item that is in a package, where the package has a transparent portion, and said code is printed directly on said consumable item in a location that can be read through said package, and where said consumable item has a material therein that is consumed and which consumable item can be replaced; and using a computer for decoding said encryption code and determining if said encryption code was formed using an authorized encryption technique, and establishing said consumable item as authentic based on it having been formed using said authorized encryption technique, wherein said encryption code represents a date associated with the consumable item.

12. A method as in claim 11, wherein said date represents an expiration date of the consumable item.

* * * * *